United States Patent
Kim

(10) Patent No.: US 8,023,526 B2
(45) Date of Patent: Sep. 20, 2011

(54) ADAPTIVE CHANNEL PREDICTION APPARATUS AND METHOD FOR PERFORMING UPLINK PRE-EQUALIZATION DEPENDING ON DOWNLINK CHANNEL VARIATION IN OFDM/TDD MOBILE COMMUNICATION SYSTEM

(75) Inventor: Jin-Kyeom Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 712 days.

(21) Appl. No.: 11/709,305

(22) Filed: Feb. 21, 2007

(65) Prior Publication Data
US 2007/0211747 A1 Sep. 13, 2007

(30) Foreign Application Priority Data
Feb. 21, 2006 (KR) .................. 10-2006-0016980

(51) Int. Cl.
*H04J 3/16* (2006.01)
(52) U.S. Cl. .................. 370/437; 375/296; 375/316
(58) Field of Classification Search .................. 370/437; 375/216, 267, 316; 455/63.1, 67.16
See application file for complete search history.

(56) References Cited

U.S. PATENT DOCUMENTS

| | | | |
|---|---|---|---|
| 6,324,220 B1* | 11/2001 | Sellars | 375/296 |
| 6,983,125 B2* | 1/2006 | Smee et al. | 455/63.1 |
| 7,315,530 B2* | 1/2008 | Castelain et al. | 370/335 |
| 2002/0159537 A1* | 10/2002 | Crilly, Jr. | 375/267 |
| 2005/0030925 A1* | 2/2005 | Salzer | 370/334 |
| 2005/0105647 A1* | 5/2005 | Wilhelmsson et al. | 375/316 |
| 2007/0041428 A1* | 2/2007 | Wang et al. | 375/146 |

* cited by examiner

*Primary Examiner* — Huy Vu
*Assistant Examiner* — Maria Sekul
(74) *Attorney, Agent, or Firm* — The Farrell Law Firm, P.C.

(57) ABSTRACT

Disclosed are an apparatus and a method for changing a channel prediction depending on the degree of downlink channel variation in predicting an uplink channel for uplink pre-equalization. N number of Doppler frequency ranges are set according to downlink channel variation degrees, and uplink channel prediction schemes corresponding to the respective Doppler frequency ranges are established. A Doppler frequency is measured from a signal received over a downlink channel, and the Doppler frequency range, within which the measured Doppler frequency is included, is determined from among the Doppler frequency ranges. The channel prediction scheme established corresponding to the determined Doppler frequency is selected, and the uplink pre-equalization is performed by using the selected channel prediction scheme. This enables uplink pre-equalization that is suitable for a channel varying with a terminal's moving speed or other channel environments.

10 Claims, 4 Drawing Sheets

ADAPTIVE CHANNEL PREDICTION APPARATUS AND METHOD FOR PERFORMING UPLINK PRE-EQUALIZATION DEPENDING ON DOWNLINK CHANNEL VARIATION IN OFDM/TDD MOBILE COMMUNICATION SYSTEM

PRIORITY

This application claims priority to applications entitled "Adaptive Channel Prediction Apparatus and Method for Performing Uplink Pre-Equalization Depending on Downlink Channel Variation in OFDM/TDD Mobile Communication System" filed in the Korean Industrial Property Office on Feb. 21, 2006 and assigned Serial No. 2006-0016980, the contents of which are incorporated herein by reference.

BACKGROUND OF THE INVENTION

1. Field of the Invention

The present invention relates to pre-equalization in a mobile communication system employing an Orthogonal Frequency Division Multiplexing (hereinafter referred to as "OFDM") scheme and a Time Division Duplex (hereinafter referred to as "TDD") scheme, that is, an OFDM/TDD mobile communication system, and more particularly to an adaptive channel prediction apparatus and an adaptive channel prediction method for changing channel prediction depending on the degree of downlink channel variation in uplink pre-equalization using an estimated downlink channel.

2. Description of the Related Art

Next-generation multimedia systems require the transmission of high-capacity data at high speeds in a mobile wireless channel environment and must meet a rapidly increasing demand for wireless communications. Accordingly, research is actively being conducted in order to provide a transmission scheme which has high frequency utilization efficiency while enabling high-speed data transmission. In order to transmit data having a short symbol duration at a high speed, it is necessary to ensure a wide transmission band and to prevent frequency-selective fading from being caused by Inter-Symbol Interference (ISI) or Multi-Path Interference (MPI) of wireless channels. To this end, a multi-carrier technique has been developed, in which a symbol duration is extended and a data symbol is transmitted over a plurality of carriers.

An OFDM scheme, one of the multi-carrier techniques, is advantageous in that frequency utilization efficiency is high due to data transmission over mutually orthogonal sub-carriers whose frequency bands overlap, and fast implementation of modulation/demodulation using a multi-carrier is possible through IFFT (Inverse Fast Fourier Transform) and FFT (Fast Fourier Transform). Further, in the OFDM scheme, it is possible to achieve equalization with one tap per sub-carrier by using a guard interval longer than the delay spread of a signal, resulting from a multi-path channel, for maintaining orthogonality between sub-carriers.

Pre-equalization is a method for compensating for channel distortion prior to transmission by using the equalization simplicity of an OFDM system and reciprocity of a TDD channel. As used herein, the reciprocity of a TDD channel refers to the property that correlation between uplink and downlink channels is very high because both the uplink and downlink channels use the same frequency, and characteristics as well as Doppler frequencies of both the channels are the same in the case of simultaneous transmissions over both channels. Therefore, a downlink channel is estimated in a TDD mode system in order to use it for reception equalization, and the estimated downlink channel can also be used for compensating for the distortion of an uplink channel prior to transmission. The equalization at a receiving-end generally results in noise amplification and thus performance deterioration, but the re-equalization has an advantage in that there is no noise amplification because it is performed prior to transmission. Further, since the equalization at a receiving-end is not needed when the pre-equalization is performed, the pre-equalization is characterized in that it can reduce the complexity of a receiver.

In general, the pre-equalization may be largely divided into two schemes. One scheme is for a case where the reciprocity of a TDD channel is maintained, and the other scheme is for a case where the reciprocity of a TDD channel is not maintained because of the Doppler effect according to terminal movement.

In the pre-equalization scheme for the case where the reciprocity of a TDD channel is maintained, that is, the case where there is almost no terminal movement or a slot interval is sufficiently smaller than a coherence time of the channel, the pre-equalization is performed in such a manner that a channel coefficient is estimated in the last symbol interval of a downlink period in a terminal, and the estimated channel coefficient is used for equalizing all symbols in a next uplink period.

Reference will now be made to FIG. 1, a structural block diagram illustrating an OFDM transceiver in a terminal, which is operative to perform pre-equalization in a case where the reciprocity of a TDD channel is maintained.

A signal transmitted from a base station goes through a multi-path channel and is received with noise added thereto through an antenna of the terminal. The signal received through the antenna passes through a duplexer 100 and is input into a RF processor 102, which in turn down-converts the input signal into an IF (Intermediate Frequency) band signal. Subsequently, an A/D (Analogue-to-Digital) converter (not illustrated) converts the analogue IF band signal into a digital base band signal, and then a burst symbol extractor (not illustrated) extracts an OFDM symbol from the digital base band signal. The OFDM symbol extracted by the burst symbol extractor is processed in such a manner that its CP (Cyclic Prefix), which a transmitting side has inserted therein, is removed by means of a CP remover 104, is subjected to fast Fourier transform through a FFT (Fast Fourier Transformer) 106, and then is applied to a reception equalizer 108. The reception equalizer 108 compensates for channel distortion for the fast Fourier transformed data signal according to a channel characteristic value estimated by means of a channel estimator 112. This channel distortion-compensated signal is demodulated in a demodulator 110.

A transmission equalizer 114 performs the pre-equalization in such a manner that a channel coefficient estimated in the channel estimator 112, that is, a channel coefficient estimated in the last symbol interval of a downlink period, is used for equalizing all symbols in a next uplink period. A coherence time represents a statistic of time intervals over which the impulse response of a channel hardly varies. Combining algorithms such as MRC (Maximal Ratio Combining), EGC (Equal Gain Combining), ZF (Zero Forcing) and MMSE (Minimum Mean Square Error) algorithms may be used for the equalization at a receiving-end, which is performed to provide for the pre-equalization. Further, it is possible to utilize SINR (Signal to Interference plus Noise Ratio)-based pre-equalization methods in which transmission power is restricted in the same manner as in the case of not using the pre-equalization.

Symbols output from the transmission equalizer 114 are transmitted to the base station via an IFFT (Inverse Fast Fourier Transformer) 116, a CP inserter 118, a RF processor 120, and the duplexer 100.

In the case where the reciprocity of a TDD channel is not maintained because of the movement of a terminal or other channel environments, it is necessary to perform a procedure of predicting uplink channel variation based on downlink channel variation by using a downlink channel value estimated prior to pre-equalization because an estimated downlink channel is not the same as an uplink transmission channel. That is, when the reciprocity of a TDD channel is not maintained as stated above, characteristics of the uplink channel change from those of the downlink channel, and thus serious deterioration of pre-equalization performance is caused by incomplete equalization. Thus, the uplink channel variation needs to be predicted such that performance deterioration is prevented from being caused by the incomplete equalization.

Reference will now be made to FIG. 2, which is a structural block diagram illustrating an OFDM transceiver in a terminal, which is operative to perform channel prediction in a case where the reciprocity of a TDD channel is not maintained. Except for a channel estimator 212 and an uplink channel predictor 213, the OFDM transceiver in FIG. 2 has the same internal structure as that of the OFDM transceiver in FIG. 1, and thus a description of the remaining parts will be omitted.

A received signal is fast Fourier transformed by means of the FFT 106, and then is applied to the reception equalizer 108. The reception equalizer 108 compensates for channel distortion for the fast Fourier transformed data signal according to a channel characteristic value estimated by means of the channel estimator 212. This channel distortion-compensated signal is demodulated in a demodulator 110.

The uplink channel predictor 213 performs uplink channel prediction by using the channel coefficient estimated in the channel estimator 212. The uplink channel predictor 213 may use a channel prediction method in which channel variation is detected through interpolation or curve fitting of an estimated channel in a time domain, and extrapolation is applied based on the detected channel variation. There is another method for calculating a statistically predicted value from an estimated downlink channel value by using a Bessel function. The channel estimated in a time domain is converted into a channel in a frequency domain so as to perform pre-equalization in the transmission equalizer 114.

As stated above, each of the two conventional pre-equalization schemes employs an OFDM transceiver of a terminal, which is independently applied in the case where the reciprocity of a TDD channel is maintained or in the case where the reciprocity of a TDD channel is not maintained. However, it is common that a terminal is subject to both cases, that is, a case where the terminal is moved and a case where the terminal is stationary. Thus, if a terminal uses an OFDM transceiver taking only one case into consideration, only channel estimation or channel prediction optimized to the corresponding case can be performed. For example, when a terminal is moving, a channel prediction method is always applied in order to perform pre-equalization for the case where the reciprocity of a TDD channel is not maintained, there is a disadvantage in that unnecessary channel prediction is performed even in a situation where the reciprocity of a TDD channel is maintained. Further, although the degree of the reciprocity of a TDD channel varies with a terminal moving speed and an optimal channel prediction method also changes accordingly, it is impossible to control the channel prediction method according to respective situations.

SUMMARY OF THE INVENTION

Therefore, there is a need for an OFDM transceiver that can accommodate both cases, that is, the case where a terminal moves and thus reciprocity is not maintained, and the case where a terminal is stationary and thus reciprocity is maintained.

Accordingly, the present invention has been made to aspect at least the above-mentioned problems occurring in the prior art, and an object of the present invention is to provide an adaptive channel prediction apparatus and an adaptive channel prediction method for differing channel prediction depending on the degree of downlink channel variation when uplink pre-equalization using an estimated downlink channel is performed in an OFDM/TDD mobile communication system.

In order to accomplish this and other aspects, in accordance with an aspect of the present invention, there is provided an adaptive channel prediction method for performing uplink pre-equalization depending on downlink channel variation in an OFDM/TDD mobile communication system, the method includes setting N (natural number) number of Doppler frequency ranges according to downlink channel variation degrees, and establishing uplink channel prediction schemes corresponding to the respective Doppler frequency ranges; measuring a Doppler frequency from a signal received over a downlink channel; determining the Doppler frequency range, within which the measured Doppler frequency is included, from among the N number of Doppler frequency ranges, and selecting the channel prediction scheme established corresponding to the determined Doppler frequency; and performing the uplink pre-equalization by using the selected channel prediction scheme.

In accordance with another aspect of the present invention, there is provided an adaptive channel prediction apparatus for performing uplink pre-equalization depending on downlink channel variation in an OFDM/TDD mobile communication system, the apparatus includes a memory unit for storing N (natural number) number of Doppler frequency ranges according to uplink channel variation degrees, and channel prediction schemes established corresponding to the respective Doppler frequency ranges; a Doppler frequency measurement unit for measuring a Doppler frequency from a signal received over a downlink channel; a channel prediction scheme selector for determining the Doppler frequency range, within which the measured Doppler frequency is included, from among the N number of Doppler frequency ranges, and selecting the channel prediction scheme established corresponding to the determined Doppler frequency; a channel predictor for predicting a uplink channel by using the selected channel prediction scheme; and a transmission equalizer for previously compensating for channel distortion based on the uplink channel predicted by the channel predictor.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
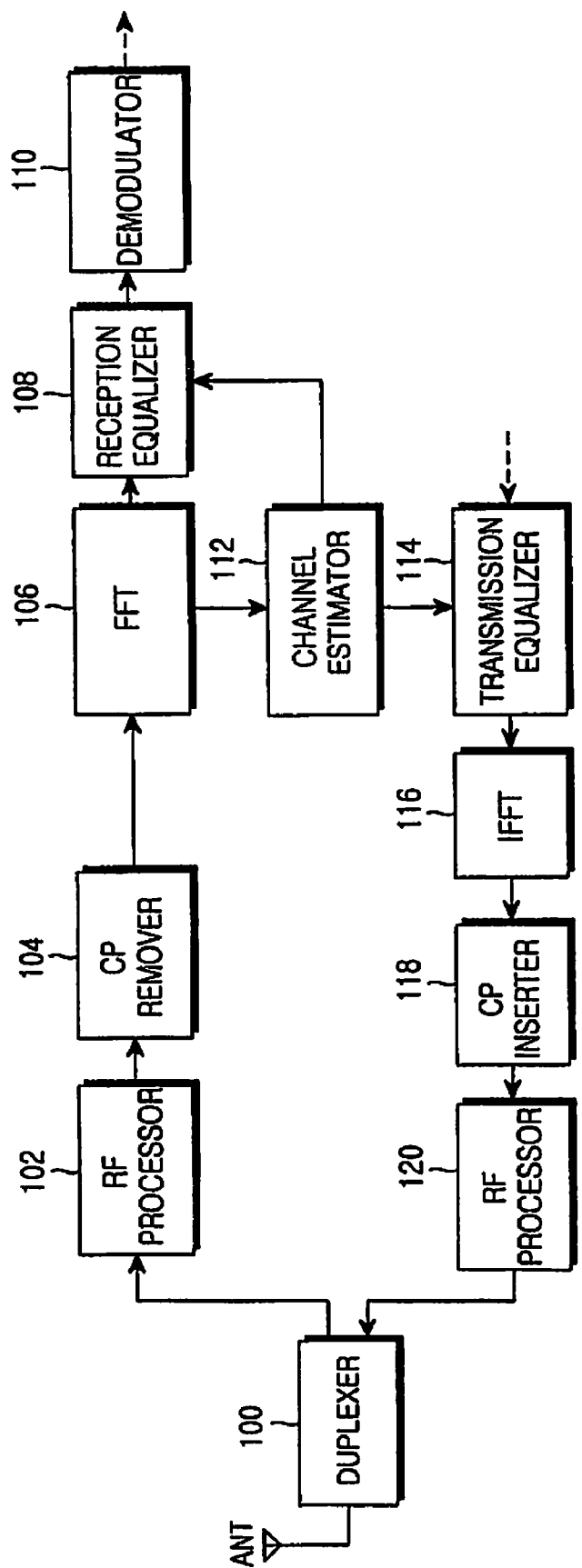
FIGS. 1 and 2 are structural block diagrams illustrating common OFDM transceivers.
Figure 2:
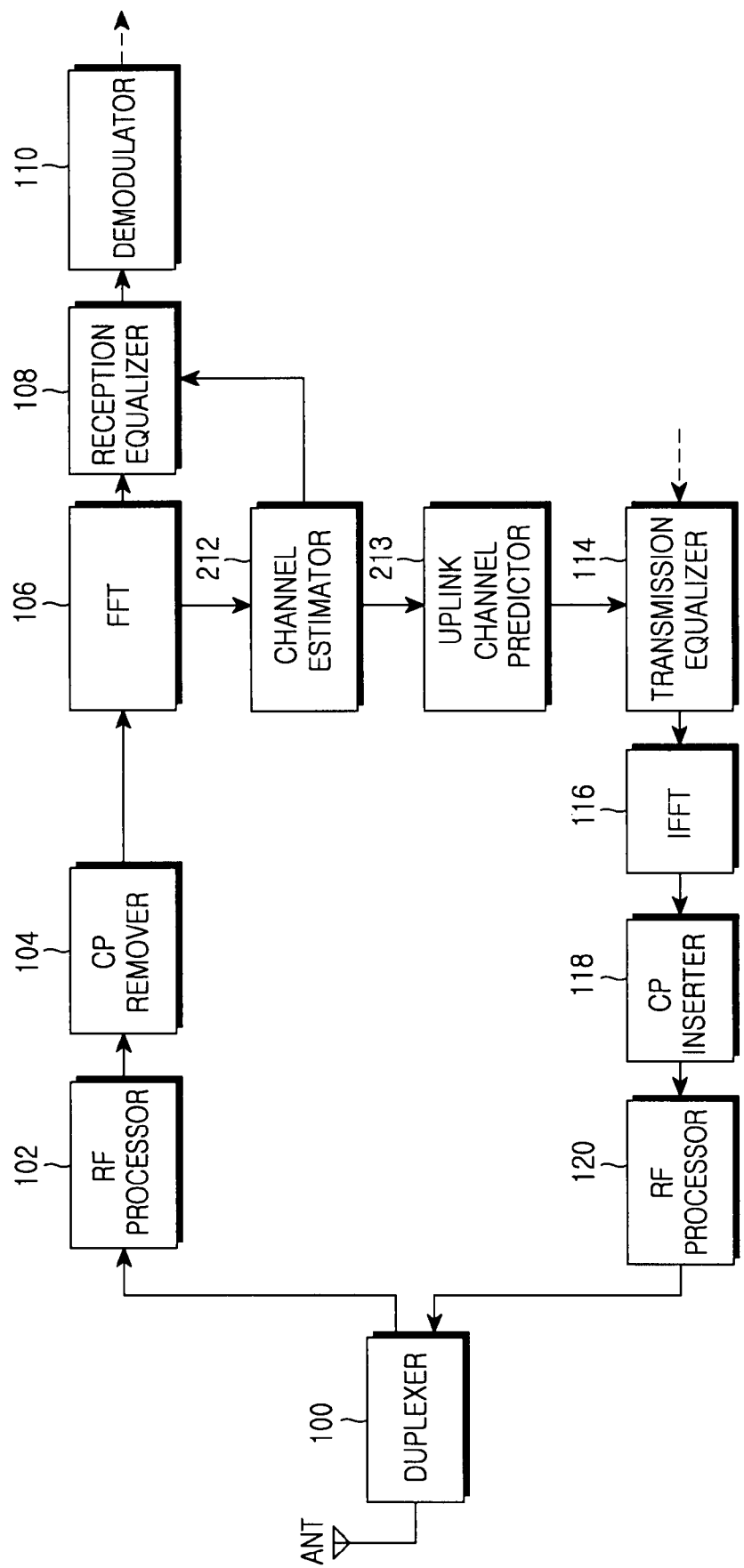

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

In the present invention, whether or not the reciprocity of a TDD channel is maintained is checked using the Doppler frequency of a downlink channel in order to apply a channel prediction procedure for performing pre-equalization only when the moving speed of a terminal is greater than or equal to a specific threshold value or only when the reciprocity of a TDD channel is not maintained and channel variation occurs in a slot interval in an OFDM/TDD mobile communication system. Thus, only when the Doppler frequency value of a downlink channel is greater than or equal to a specific threshold value, an uplink channel prediction procedure is performed. Here, the specific threshold value represents a minimum of the Doppler frequencies at which characteristics of the downlink channel differ from those of the uplink channel.

The greater the degree of the downlink channel variation, the greater the number of calculations required in a channel prediction scheme based on an estimated downlink channel. Thus, in this case, a scheme different from those in other cases is required. The present invention applies an adaptive channel prediction scheme in which an appropriate channel prediction scheme is selected depending on the moving speed of a terminal or the degree of channel variation, thereby providing a pre-equalization scheme suitable for a terminal that moves at high speeds and making it possible to avoid unnecessary channel prediction calculation from being executed in pre-equalization for a terminal that moves at low speeds or is not on the move.

Figure 3:
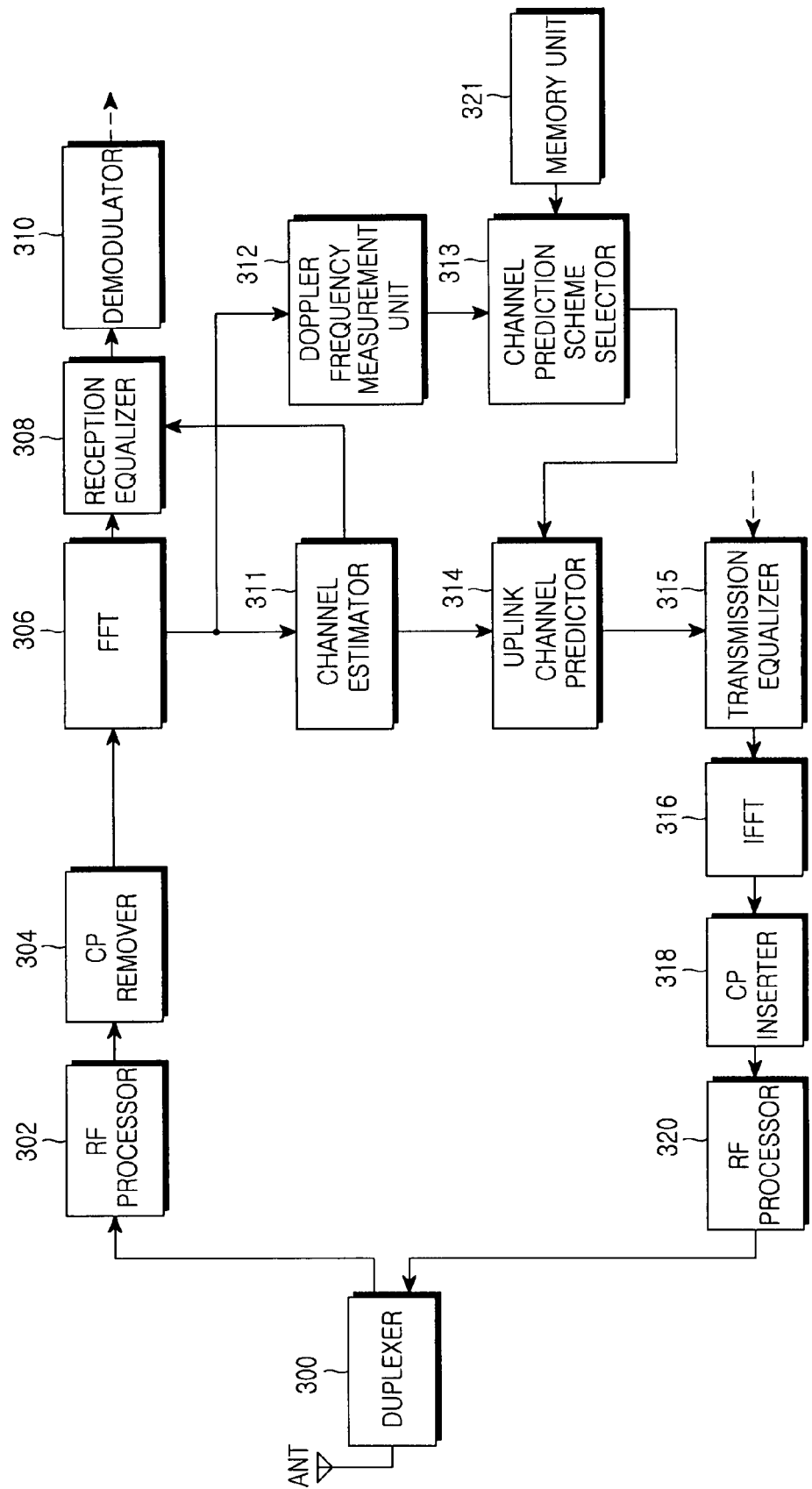
FIG. 3 is a structural block diagram illustrating an OFDM transceiver performing channel prediction for uplink pre-equalization in accordance with the present invention.

Reference will now be made to an OFDM transceiver, which provides an optimal channel prediction scheme for performing pre-equalization depending on the degree of channel variation, with reference to FIG. 3. FIG. 3 is a structural block diagram illustrating an OFDM transceiver performing channel prediction for uplink pre-equalization in accordance with the present invention.

A signal transmitted from a base station goes through a multi-path channel, and is received with noise added thereto through an antenna of a terminal. The signal received through the antenna passes through a duplexer 300 and is input into a RF processor 302, which in turn down-converts the input signal into an IF band signal. Subsequently, an A/D converter (not illustrated) converts the analogue IF band signal into a digital base band signal, and then a burst symbol extractor (not illustrated) extracts an OFDM symbol from the digital base band signal. The OFDM symbol extracted by the burst symbol extractor is processed in such a manner that its CP, which a transmitting side has inserted therein, is removed by means of a CP remover 304, is subjected to fast Fourier transform through a FFT 306, and is then applied to a reception equalizer 308. The reception equalizer 308 compensates for channel distortion for the fast Fourier transformed data signal according to a channel characteristic value estimated by means of a channel estimator 311. This, channel distortion-compensated signal is demodulated in a demodulator 310.

A Doppler frequency measurement unit 312, into which the data signal output form the FFT 306 is input, measures a Doppler frequency from the input data signal, and then outputs a measured value of the Doppler frequency to a channel prediction scheme selector 313. The channel prediction scheme selector 313 compares the input Doppler frequency value with Doppler frequency threshold values preset for respective channel prediction schemes in order to select an appropriate channel prediction scheme. In the present invention, Doppler frequency ranges are set, and an optimal channel prediction scheme is established for each of the set Doppler frequency ranges. Subsequently, uplink re-equalization is performed using a channel prediction scheme established corresponding to the Doppler frequency range within which the Doppler frequency estimated using the downlink channel is included. The present invention enables uplink pre-equalization that is suitable for a channel varying with a terminal's moving speed or other channel environments.

In general, if the coherence time of a channel is sufficiently less than a slot interval when a terminal is stationary, characteristics of a downlink channel are the same as those of an uplink channel, and thus a channel coefficient estimated in the latest downlink period can be used intact for pre-equalization. However, since characteristics of a downlink channel become different from those of an uplink channel as the Doppler frequency increases because of the terminal movement, uplink channel prediction must precede the pre-equalization. The uplink channel prediction for pre-equalization may be performed in such a manner that downlink channel variation is estimated using interpolation or curve fitting, and then extrapolation is applied to the uplink channel prediction based on the estimated downlink channel variation. While the interpolation is usually used when the accuracy of channel prediction is high, the curve fitting is used in order to reduce the influence of erroneous channel estimation when the accuracy of channel prediction is low. An interpolation scheme or a curve fitting scheme suitable for representing the downlink channel variation changes depending on the measured Doppler frequency of a downlink channel.

For example, when channel variation in a slot interval is linear, a linear interpolation or linear curve fitting scheme is suitable for channel prediction and, there in no substantial difference in the accuracy of channel prediction between a short channel interval and a long channel interval for the interpolation and curve fitting. In contrast with this, when channel variation in a slot interval is non-linear, which is the case where the Doppler frequency is greater than the Doppler frequency in the case mentioned just before, a non-linear interpolation or curve fitting scheme is suitable for channel prediction, and a quadratic or cubic interpolation or curve fitting scheme may be required according to the degree of channel variation. Further, in order to improve performance of channel prediction, a channel interval for the interpolation or curve fitting must be longer as compared with the case where channel variation is linear.

Consequently, in the present invention, threshold values are preset, for a case where a terminal is stationary, a case where terminal movement causes linear channel variation in a slot interval, and a case where terminal movement causes non-linear channel variation in a slot interval. This is intended to select an appropriate channel prediction scheme according to the degree of the terminal movement. To this end, as proposed herein, three threshold values are preset, that is, a first threshold value for determining any one of a linear interpolation scheme and a linear curve fitting scheme to be used as a channel prediction scheme when a terminal movement causes linear channel variation in a slot interval, a second threshold value for determining any one of a quadratic interpolation scheme and a quadratic curve fitting scheme to be used as a channel prediction scheme when a terminal movement causes non-linear channel variation in a slot interval, and a third threshold value for determining any one of a cubic interpolation scheme and a cubic curve fitting scheme to be used as a channel prediction scheme when a terminal movement cause non-linear channel variation in a slot interval. Although three threshold values are set in the present invention, at least two threshold values may be set according to the accuracy of channel prediction. Such preset threshold values are stored in a memory unit 321.

The present invention provides a way to perform uplink pre-equalization by using an optimal channel prediction scheme selected depending on the degree of downlink channel variation. Since the present invention is not directly connected with a common Doppler frequency measurement method using a downlink channel, which is performed in selecting the channel prediction scheme, a description thereof will be omitted herein. In addition, since common interpolation schemes (including linear, quadratic and cubic interpolation schemes) or common curve fitting schemes (including linear, quadratic and cubic curve fitting schemes) are well known in the art, a description thereof will also be omitted herein. Further, although channel estimation is performed using linear, quadratic and cubic interpolation/curve fitting schemes for the respective Doppler frequency ranges in the present invention, other channel prediction schemes may be used according to the respective Doppler frequency ranges.

A channel prediction scheme selector 313 compares a Doppler frequency $f_d(0)$ measured in the Doppler frequency measurement unit 312 with the first, second and third threshold values pre-stored in the memory unit 321. Such a procedure of selecting a channel prediction scheme will be discussed below in detail with reference to FIG. 4. Once an appropriate channel prediction scheme is selected, an uplink channel predictor 314 predicts an uplink channel by using the channel prediction scheme selected by the channel prediction scheme selector 313. Such an uplink channel predicted in a time domain is converted into that in a frequency domain, and the transmission equalizer 315 performs pre-equalization for the frequency domain-uplink channel. A transmission signal, which has been subjected to the pre-equalization, is transmitted to the base station via an IFFT 316, a CP inserter 318 and a RF processor 320.

Figure 4:
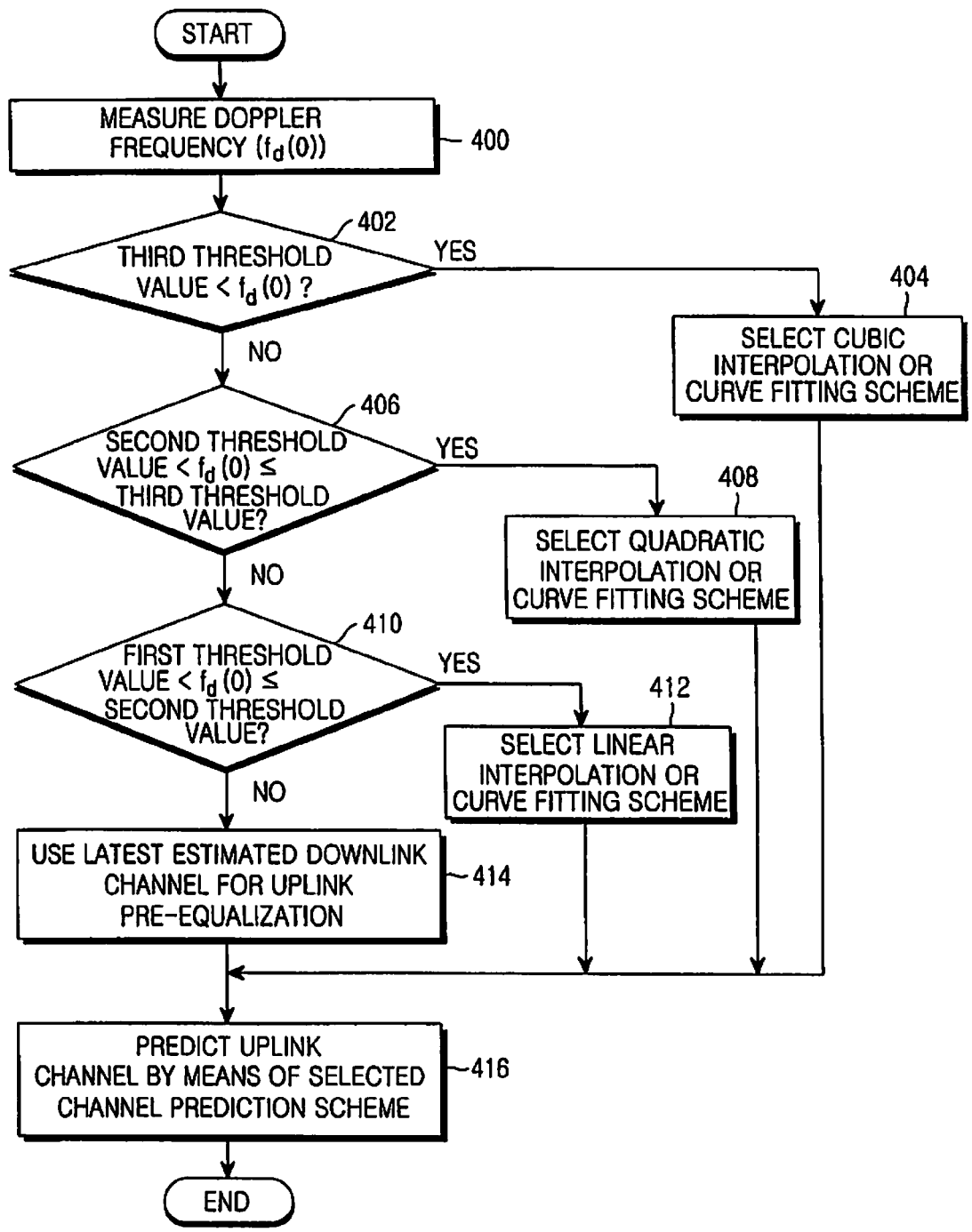
FIG. 4 is a flowchart illustrating a procedure of adaptively selecting a channel prediction scheme depending on the degree of downlink channel variation in accordance with the present invention.

Reference will now be made to FIG. 4, which is a flowchart illustrating a procedure of adaptively selecting a channel prediction scheme depending on the degree of downlink channel variation in accordance with the present invention.

In step 400, if a data signal output form the FFT 306 is input therein, the Doppler frequency measurement unit 412 measures Doppler frequency $f_d(0)$ from the input data signal, and then outputs a measured value of the Doppler frequency to the channel prediction scheme selector 313.

The channel prediction scheme selector 313 then checks in step 402 if the measured value of the Doppler frequency exceeds the third threshold value. The third threshold value is a threshold value for determining that a cubic interpolation or curve fitting scheme is suitable for channel prediction when downlink channel variation is non-linear. If a result of the check in step 402 shows that the measured value of the Doppler frequency exceeds the third threshold value, the channel prediction scheme selector 313 proceeds to step 404 to select the cubic interpolation or curve fitting scheme as a channel prediction scheme, and then the uplink channel predictor 314 performs channel prediction in step 416 by using the selected channel prediction scheme.

If a result of the check in step 402 shows that the measured value of the Doppler frequency is less than or equal to the third threshold value, the channel prediction scheme selector 313 proceeds to step 406 to check if the measured value of the Doppler frequency exceeds the second threshold value and is less than or equal to the third threshold value. Here, the second threshold value is a threshold value for determining that a quadratic interpolation or curve fitting scheme is suitable for channel prediction when a terminal movement causes non-linear channel variation in a slot interval. If the measured value of the Doppler frequency exceeds the second threshold value and is less than or equal to the third threshold value, the channel prediction scheme selector 313 proceeds to step 408 to select the quadratic interpolation or curve fitting scheme as a channel prediction scheme, and then the uplink channel predictor 314 performs channel prediction in step 416 by using the selected channel prediction scheme.

If a result of the check in step 402 shows that the measured value of the Doppler frequency is less than or equal to the second threshold value, the channel prediction scheme selector 313 proceeds to step 410 to check if the measured value of the Doppler frequency exceeds the first threshold value and is less than or equal to the second threshold value. Here, the first threshold value is a threshold value for determining a case where a terminal movement causes linear channel variation in a slot interval. If the measured value of the Doppler frequency exceeds the first threshold value and is less than or equal to the second threshold value, the channel prediction scheme selector 313 proceeds to step 412 to select a linear interpolation or curve fitting scheme as a channel prediction scheme, and then the uplink channel predictor 314 performs channel prediction in step 416 by using the selected channel prediction scheme.

However, if a result of the check in step 402 shows that the measured value of the Doppler frequency is less than or equal to the first threshold value, the channel prediction scheme selector 313 proceeds to step 414 to select a scheme in which an initially estimated uplink channel is used intact for uplink pre-equalization, and then the uplink channel predictor 314 perform channel prediction in step 416 by using the selected scheme. Here, the case where the measured value of the Doppler frequency less than or equal to the first threshold value is determined as a case where characteristics of the downlink and uplink channels are substantially the same, and thus a channel coefficient estimated in the latest downlink period is used intact for the uplink pre-equalization, as in the existing uplink pre-equalization scheme.

Three threshold values, and thus three Doppler frequency ranges, are set in the present invention illustrated in FIG. 4, but at least two Doppler frequency ranges may be set according to the accuracy of channel prediction. Further, although FIG. 4 illustrates that the cubic interpolation or curve fitting scheme is selected for the Doppler frequency range exceeding the third threshold value, the quadratic interpolation or curve fitting scheme is selected for the Doppler frequency range between the second and third threshold values, and the linear interpolation or curve fitting is selected for the Doppler frequency range between the first and second threshold values, more optimal channel prediction schemes other than the above-mentioned channel prediction schemes may be preset according to the respective Doppler frequency ranges. Further, in addition to the linear, quadratic and cubic interpolation or curve fitting schemes, a Bessel function may be used for channel prediction.

As described above, the present invention can efficiently ensure the mobility of a user by selecting an appropriate channel prediction scheme for uplink pre-equalization depending on the degree of downlink channel variation and performing the pre-equalization based on the selected channel prediction scheme. Further, the present invention applies an adaptive channel prediction scheme according to channel variation in performing in the uplink pre-equalization, thereby providing a pre-equalization scheme suitable for a terminal that moves at high speeds and making it possible to avoid unnecessary channel prediction calculation from being executed in pre-equalization for a terminal that moves at low speeds or is not on the move.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An adaptive channel prediction method for performing uplink pre-equalization based on downlink channel variation in an Orthogonal Frequency Division Multiplexing/Time Division Duplex (OFDM/TDD) mobile communication system, the method comprising the steps of:
   setting N number of Doppler frequency ranges, and establishing N number of uplink channel prediction schemes corresponding to the N number of Doppler frequency ranges, respectively;
   measuring a Doppler frequency from a signal received over a downlink channel;
   determining a Doppler frequency range, within which the measured Doppler frequency is included, from among the N number of Doppler frequency ranges;
   selecting an uplink channel prediction scheme from among the N number of uplink channel prediction schemes, corresponding to the determined Doppler frequency range; and
   performing the uplink pre-equalization by using the selected uplink channel prediction scheme.

2. The method as claimed in claim 1, wherein the N uplink channel prediction schemes include channel prediction schemes capable of optimally predicting an uplink channel according to a reciprocity degree of the downlink/uplink channel in a TDD channel.

3. The method as claimed in claim 1, wherein at least one of the N number of uplink channel prediction schemes is selected from a group consisting of a linear interpolation scheme, a quadratic interpolation scheme, a cubic interpolation scheme, a linear curve fitting scheme, a quadratic curve fitting scheme and a cubic curve fitting scheme.

4. The method as claimed in claim 1, further comprising setting one of the N number of Doppler frequency ranges as a Doppler frequency range for determining if characteristics of the downlink and uplink channels are substantially the same, and establishing an uplink channel prediction scheme, which uses a channel coefficient estimated in a latest downlink period, as the channel prediction scheme corresponding to the Doppler frequency range for determining if characteristics of the downlink and uplink channels are substantially the same.

5. An adaptive channel prediction apparatus for performing uplink pre-equalization depending on downlink channel variation in an Orthogonal Frequency Division Multiplexing/Time Division Duplex (OFDM/TDD) mobile communication system, the apparatus comprising:
   a memory unit for storing N number of Doppler frequency ranges, and N number of uplink channel prediction schemes established corresponding to the N number of Doppler frequency ranges, respectively;
   a Doppler frequency measurement unit for measuring a Doppler frequency from a signal received over a downlink channel;
   a channel prediction scheme selector for determining a Doppler frequency range, within which the measured Doppler frequency is included, from among the N number of Doppler frequency ranges, and selecting an uplink channel prediction scheme from among the N number of uplink channel prediction schemes, corresponding to the determined Doppler frequency range;
   a channel predictor for predicting an uplink channel by using the selected uplink channel prediction scheme; and
   a transmission equalizer for compensating for channel distortion based on the uplink channel predicted by the channel predictor.

6. The apparatus as claimed in claim 5, wherein the N number of uplink channel prediction schemes include channel prediction schemes capable of optimally predicting an uplink channel according to a reciprocity degree of the downlink/uplink channel in a TDD channel.

7. The apparatus as claimed in claim 5, wherein the N number of uplink channel prediction scheme is selected from a group consisting of a linear interpolation scheme, a quadratic interpolation scheme, a cubic interpolation scheme, a linear curve fitting scheme, a quadratic curve fitting scheme and a cubic curve fitting scheme.

8. The apparatus as claimed in claim 5, wherein the memory unit stores one of the N number of Doppler frequency ranges as a Doppler frequency range for determining if characteristics of the downlink and uplink channels are substantially the same, and further stores an uplink channel prediction scheme, which uses a channel coefficient estimated in a latest downlink period, corresponding to the Doppler frequency range.

9. The method as claimed in claim 1, further comprising comparing the measured Doppler frequency with at least one threshold value for identifying the N number of Doppler frequency ranges,
   wherein the Doppler frequency range, within which the measured Doppler frequency is included, from among the N number of Doppler frequency ranges is determined based on the comparison result.

10. The apparatus as claimed in claim 5, wherein the channel prediction scheme selector compares the measured Doppler frequency with at least one threshold value for identifying the N number of Doppler frequency ranges, and determines the Doppler frequency range, within which the measured Doppler frequency is included, from among the N number of Doppler frequency ranges based on the comparison result.

* * * * *